United States Patent
Trim et al.

(10) Patent No.: US 11,818,657 B2
(45) Date of Patent: Nov. 14, 2023

(54) POWER CONSUMPTION OPTIMIZATION OF USER EQUIPMENT IN A 5G NETWORK BASED ON RCL MODULATION OF PACKETS

(71) Applicant: International Business Machines Corporation, Armonk, NY (US)

(72) Inventors: Craig M. Trim, Ventura, CA (US); Benjie Asuncion Amaba, Collierville, TN (US); Gandhi Sivakumar, Bentleigh (AU); Kushal S. Patel, Pune (IN); Sarvesh S Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 123 days.

(21) Appl. No.: 17/487,139

(22) Filed: Sep. 28, 2021

(65) Prior Publication Data

US 2023/0099750 A1 Mar. 30, 2023

(51) Int. Cl.
  *H04W 52/02* (2009.01)
  *H04W 28/08* (2023.01)
      (Continued)

(52) U.S. Cl.
  CPC ... *H04W 52/0222* (2013.01); *H04W 28/0967* (2020.05); *H04W 40/125* (2013.01);
      (Continued)

(58) Field of Classification Search
  CPC .................. H04W 88/00–06; H04L 2101/622
  See application file for complete search history.

(56) References Cited

U.S. PATENT DOCUMENTS

| 10,039,043 B2 | 7/2018 | Zhang |
| 10,044,613 B2 | 8/2018 | Kazmi |

(Continued)

FOREIGN PATENT DOCUMENTS

WO    2020034427 A1    2/2020

OTHER PUBLICATIONS

"Optimizing Network Applications for 5G—Ericsson", ericsson. com, 3 pps., Apr. 21, 2017, <https://www.ericsson.com/ en/news/ 2017/4/optimizing-network-applications-for-5g>.

(Continued)

*Primary Examiner* — San Htun
(74) *Attorney, Agent, or Firm* — Peter Suchecki

(57) ABSTRACT

A method for power-savings of UE operating within a 5G network. Transmission requirement data of logical channels for application-level data are collected from SDAP, including logical channel ID, application ID, and QCI indexing information. A list of logical channels with QCI indexing for permissible delay of packets is created. The logical channels of the list are mapped to related RLC channels. Responsive to receipt of a packet by a RLC multiplexing layer, the RLC channel ID from a SARQ packet is mapped to the list of permissible transmission delay logical channels of packets. responsive to a match between the RLC channel ID and the logical channels of the list, the packet is saved to an RLC data structure in allocated memory, and responsive to receipt of a time-critical packet, the time-critical packet, and the saved packet are submitted to a MAC carrier controller for transmission processing.

20 Claims, 3 Drawing Sheets

(51) Int. Cl.
- *H04W 40/12* (2009.01)
- *H04W 72/1263* (2023.01)
- *H04W 80/02* (2009.01)
- *H04W 84/02* (2009.01)
- *H04W 80/08* (2009.01)
- *H04L 101/622* (2022.01)

(52) U.S. Cl.
CPC ....... *H04W 72/1263* (2013.01); *H04W 80/02* (2013.01); *H04W 80/08* (2013.01); *H04W 84/02* (2013.01); *H04L 2101/622* (2022.05)

(56) References Cited

U.S. PATENT DOCUMENTS

| | | | |
|---|---|---|---|
| 10,271,224 B2 | 4/2019 | Dimou | |
| 10,785,674 B2 | 9/2020 | Cakulev | |
| 10,791,467 B2 | 9/2020 | Cui | |
| 10,958,511 B2 | 3/2021 | Majmundar | |
| 2013/0148597 A1* | 6/2013 | Lee | H04W 72/543 370/329 |
| 2014/0003320 A1* | 1/2014 | Etemad | H04W 4/08 370/312 |
| 2015/0009930 A1* | 1/2015 | Rapaport | H04W 72/542 370/329 |
| 2016/0227385 A1* | 8/2016 | Ahmad | H04L 65/1073 |
| 2018/0124843 A1 | 5/2018 | Shaheen | |
| 2018/0234877 A1* | 8/2018 | Liu | H04L 1/1812 |
| 2020/0163131 A1 | 5/2020 | Youtz | |
| 2020/0169914 A1* | 5/2020 | Govil | H04L 41/0672 |
| 2020/0236734 A1 | 7/2020 | Wei | |
| 2020/0344723 A1 | 10/2020 | Babaei | |
| 2020/0351771 A1 | 11/2020 | Geekie | |
| 2021/0029643 A1 | 1/2021 | Stauffer | |

OTHER PUBLICATIONS

Bode, "5G's Latest Problem: Summer Temps Are Causing 5G Phones To Overheat", Jul. 17, 2019, 6 pps., techdirt, <https://www.techdirt.com/articles/20190715/07241342588/5gs-latest-problem-summer-temps-are-causing-5g-phones-to-overheat.shtml>.

Horwitz, "Huawei's first 5G phone reportedly guzzles power, needs big heatsink", Jul. 30, 2018, Venture Beat, 3 pps., <https://venturebeat.com/2018/07/30/huaweis-first-5g-phone-reportedly-guzzles-power-needs-big-heatsink/>.

Hruska, "5G Modems and Phones Literally Can't Handle the Heat of Summer Weather", Jul. 19, 2019, ExtremeTech, 7 pps., <https://www.extremetech.com/mobile/295228-5g-modems-and-phones-literally-cant-handle-the-heat-of-summer-weather>.

Jasti et al., "Novel Scheme To Prioritize The TCP ACK For Throughput Improving In B4G And 5G Networks", 4 pps., Received on Aug. 27, 2019, accepted on Oct. 18, 2019, published on Nov. 5, EAI Endorsed Transactions on Cloud Systems, Research Article.

Jung, "Optimizing media and radio signal processing for 5G", 3GPP, 2 pps., Mar. 20, 2018, <https://www.3gpp.org/news-events/1950-sa4>.

Kumar et al., "Dynamic Control of RLC Buffer Size For Latency Minimization In Mobile RAN", 6 pps., downloaded from the Internet on Sep. 20, 2021, IEEE Publication: Best Available Date: Apr. 15-18, 2018.

Maximov et al., "Uplink Data Compression 3GPP Solutions for Enhancing the Uplink Performance", 21 pps., Copyright 2018 MediaTek, Inc., <https://d86o2zu8ugzlg.cloudfront.net/mediatek-craft/documents/MediaTek-UDC-White-Paper-PDFUDCWP-0718.pdf>.

Mendoza et al., "On The Capability of QoE Improvement Based on the Adjustment of RLC Parameters", Received: Mar. 16, 2020; Accepted: Apr. 26, 2020; Published: Apr. 27, 2020, sensors, 13 pps.

Pateromichelakis, et al., "Service-Tailored User-Plane Design Framework And Architecture Considerations in 5G Radio Access Networks", 21 pps., Received Jul. 7, 2017, accepted Jul. 22, 2017, date of publication Aug. 7, 2017, date of current version Sep. 19, 2017, IEEE Access, Digital Object Identifier 10.1109/ACCESS.2017.2736579.

Pedersen et al., "Agile 5G Scheduler For Improved E2E Performance And Flexibility For Different Network Implementations", (2018). Agile 5G Scheduler for Improved E2E Performance and Flexibility for Different Network Implementations. I E E E Communications Magazine, 56(3), 210-217. https://doi.org/10.1109/MCOM.2017.1700517.

International Search Report and Written Opinion dated Nov. 30, 2022 from International Application No. PCT/EP2022/076575 filed Sep. 23, 2022.

\* cited by examiner

POWER CONSUMPTION OPTIMIZATION OF USER EQUIPMENT IN A 5G NETWORK BASED ON RCL MODULATION OF PACKETS

BACKGROUND

The present invention relates to 5G (fifth generation telecommunications network) optimization, and more specifically, to user-equipment power savings by modification to the radio link controller (RLC) and carrier transformation logic of a 5G-User Plane (UP) protocol stack of Control and User Plane Separation (CUPS) architecture.

The telecommunications industry has experienced significant advancement and has been an enabler of new and improved technologies. Among these advancements is the pursuit of expanding mobility bandwidths to accommodate more Internet of Things (IoT) devices and the provision of greater and faster functionality to mobile user devices, often referred to generically as user equipment (UE). The 5G technology is expected to serve as an enabler of the telecommunication advancements and may lead to artificial intelligence (AI) functions such as observing local surroundings, reasoning, inferring, and decision making.

In a 5G telecom network, a Medium Access Control (MAC) layer of new radio (NR) provides services to the Radio Link Control (RLC) layer, in which controls are provided in the form of logical channels. These logical channels are virtualized communication network interfaces that are used to transfer IO commands (network data packets) and control instructions over a radio interface and a 5G fixed access network. A logical channel is defined by the type of information it carries and is generally differentiated as a control channel, used for transmission of control and configuration information; or as a traffic channel used for the user data. 5G new radio technology allows for the creation of multiple logical channels over a single radio bearer network using the 5G network slicing models. These logical channels are used to carry a specialized traffic between the UE device and the 5G network.

The 5G broadband utilizes millimeter waves for transmission which require additional power consumption for devices connecting to the 5G network.

SUMMARY

According to an embodiment of the present invention, a computer-implemented method, a computer program product, and a system for battery power savings of user equipment operating within a 5G network. The method provides for one or more processors initiating collection of transmission requirement data of logical channels for application-level data from a Service Data Adaptation Protocol (SDAP), and collection of logical channel identification (ID), application ID, and quality of service class identifier (QCI) indexing information. The one or more processors create a list of logical channels having acceptable QCI indexing for permissible transmission delay of packets, based on logical channel identification (ID), application ID and QCI indexing information. The one or more processors map the logical channels of the list to related radio link control (RLC) channels. The one or more processors, responsive to receipt of a packet by a RLC multiplexing layer, compare the RLC channel ID from a segmented automatic repeat request (ARQ) packet to the list of logical channels with permissible delay of transmission of packets. The one or more processors, responsive to a match between the RLC channel ID and the logical channels of the list, save the packet to an RLC data structure in allocated memory, and the one or more processors, responsive to receipt of a time-critical packet, submit the time-critical packet and the saved packet to a medium access control (MAC) carrier controller for transmission processing.

DETAILED DESCRIPTION

Figure 1:
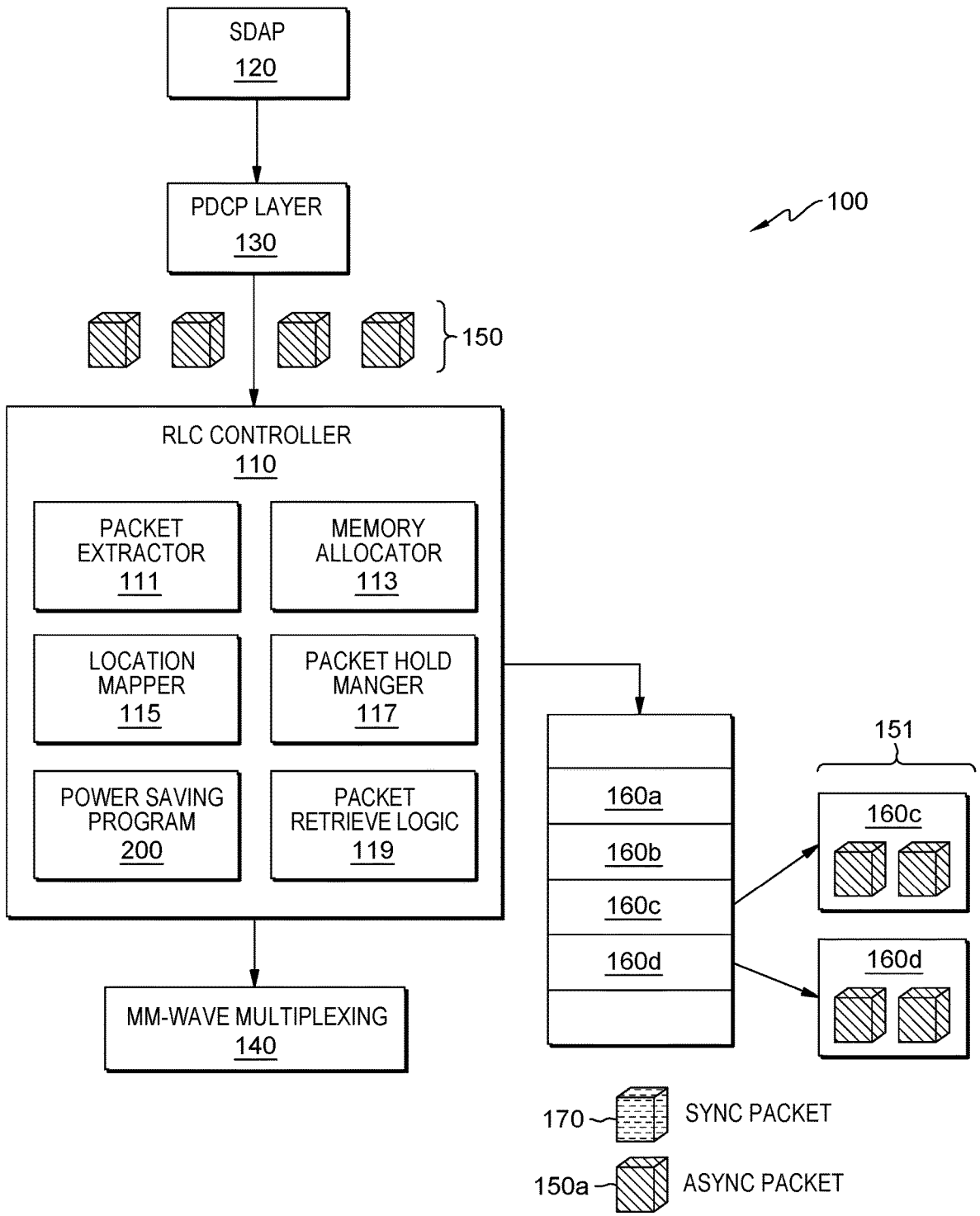
FIG. 1 is a functional block diagram illustrating a distributed data processing environment, in accordance with an embodiment of the present invention.

Embodiments of the present invention recognize that current mechanisms of radio access network (RAN) moderation do not include energy optimization features at the user equipment (UE) level. A 5G telecom network programming stack provides control and user plane separation (CUPS) architecture flexibility that offers differentiation between control and user plane selection enablement of faster data and instruction transition between the fixed accessed network (5G core) and RAN. RAN optimizations are considered at the evolved node B (eNodeB) and fixed accessed network levels, such as the serving gateway (S-GW) and packet data network gateway (P-GW), however, embodiments of the present invention recognize an absence of energy consumption optimization and power savings at the UE level.

The current RAN moderation multiplexing and the dedicated traffic channel (DTCH) multiplexing at the UE level is unable to provide power-saving optimization, which is one of the current major limitations of transitioning to 5G networks. Further, it has been observed during initial research that 5G mobiles are consuming more power and frequently switching back to 4G network because of increased device temperature and overheating. Embodiments recognize that there is a need to operate 5G-UE devices that include improved operational capabilities with lower power consumption to reduce heat generation. Further, the 5G massive broadband operates on millimeter waves lengths, which requires more power consumption by user devices.

Embodiments of the present invention provide a method, computer program product, and system for an efficient mechanism of energy optimization for non-time-critical data transmission over a radio interface of a medium access control (MAC) based data exchange, which will work with existing UE multiplexing of 5G RLC. Embodiments perform at the multiplexing layer of the 5G User Plane (UP) stack of the UE by collecting the packet traffic information from various layered systems and determining which RLC packets are not delivery time-critical. Embodiments collect application-level data transmission requirements and the quality-of-service characteristic index (QCI), which are used to determine the processing of packets to a radio interface. Embodiments collect and form a list of DTCHs having acceptable QCI indexing for permissible delayed transmission and maps the traffic channels with related RLC channels. The decision point of including a permissible transmission delay is mapped using existing pre-defined configuration policies that coordinate with the dynamic sleep time of RLC multiplexing controllers.

When a packet is received at the RLC multiplexing layer for translation and radio allocation, embodiments of the present invention extract the RLC channel identification (ID) from the segmented automatic repeat request (SEG_ARQ) packet and map the ID to the list of permissible delayed data transmission enabled channels. If the RLC channel ID is matched to a data transmission enabled channel of the list, power consumption savings at the UE can be realized by reducing or delaying invocation of transport multiplexing at the MAC and carrier-based multiplexing of the packets. Embodiments of the present invention save the packets in additionally allocated memory accessible by the RLC controller, and the multiplexer polls for the priority delivery packet from other channels. The priority delivery packet is saved and waits in local memory for the hybrid automatic repeat request (HARM) to awake and for the carrier controller to process the packet. The RLC controller and MAC based device connector functions are kept in a sleep mode while not in use.

In response to the RLC controller receiving a subsequent packet, the RLC extracts the application channel ID and examines related asynchronous field parameters. If the packet is initiated from an application serving a time-critical operation, demanding immediate delivery over a radio bearer, the carrier controllers are switched to an active state, and the time-critical packet and the asynchronous saved packet are submitted to the MAC carrier controller together for further processing. No latency is experienced by concurrently processing the packets due to carrier controller capabilities.

Because the physical carrier and MAC-based transport handling are battery power-intensive tasks, embodiments of the present invention save battery power by reducing active time for the RLC controller during receipt of non-time-critical packets and processing of the packets simultaneously by the MAC carrier controller. In some embodiments, embodiments can be engaged based on the available battery power of the UE device or automatically applied when the device power level is lower than a pre-defined threshold value. Embodiments manipulate logical channels of the network and apply application and channel delivery requirement information in determining the delay of packet transmission decisions for certain logical channels of the 5G network. The resulting delay of non-time-critical packet transmission reduces invocation of the physical radio interface that has high energy requirements. Embodiments minimize the active state of the RLC carrier controller, which increases the sleep mode, and delivery of asynchronous delayed packets occurs along with subsequently received time-critical DTCH packets.

Embodiments utilize available transportation bandwidth in a single carrier processing slot which improves optimization of resources. Embodiments perform an intelligent selection of packets by generating a list of application IDs, logical channels, and QCI characteristics and avoid impacts to application performance due to RLC processing. Embodiments apply to 5G networks as the third generation, the fourth generation, and LTE networks lack mechanisms by which packet information can be mapped to generated listings of applications and channels with permissible levels of transmission delay of packets. Some embodiments integrate the provided power management efficiencies of embodiments of the present invention as part of an energy-saving mode of a user equipment (UE) device.

The terminology used in the present application includes acronyms which are used for brevity and defined as follows for clarity:

5G-UP—user plane of the protocol stack of a 5G network—The User Plane, also called the Data Plane, carries the network user traffic. A plane, in a networking context, is one of three integral components of a telecommunications architecture. These three elements are the data plane, the control plane, and the management plane.

CUPS—Control and User Plane Separation—it allows operators to separate the evolved packet core (EPC) into a control plane that can sit in a centralized location and for the user plane to be placed closer to the application it is supporting. This type of separation is key for applications such as the connected car. CUPS makes it possible for networks to handle advanced tasks like network slicing.

RAN—A Radio Access Network is a major component of a wireless telecommunications system that connects individual devices to other parts of a network through a radio link.

DTCH—(radio bearer channels)—Dedicated Traffic Channel

SDAP—The Service Data Adaptation Protocol is responsible for mapping between a quality-of-service flow from the 5G core network and a data radio bearer, as well as marking the quality-of-service flow identifier (QFI) in uplink and downlink packets.

RLC—radio link control—a protocol used in 5G New Radio, located on top of the MAC-layer and below the PDCP-layer.

MAC (elements)—The Medium Access Control layer of a 5G New Radio network controls the hardware for interaction with the transmission medium. The MAC layer provides flow control and multiplexing for the transmission medium.

NR—new radio; shorthand for "5G NW"; used to describe 5G in the same way LTE is used to describe 4G.

3GPP—The $3^{rd}$ Generation Partnership Project is an umbrella term for multiple standards organizations that develop protocols for mobile telecommunications.

QCI—Quality of Service Class Identifier—used in 3GPP Long Term Evolution (LTE) networks to ensure carrier traffic is allocated appropriate Quality of Service (QoS). Different carrier traffic requires different QoS and therefore different QCI values.

TTL compliance—time to leave

RTT—round trip time

UE—user equipment (e.g., cell phone)

eNodeB—evolved node B, an upgraded version of 4G LTE radio base station that can connect 4G LTE devices to the mobile network when a 5G Cloud-Native core network is used by the mobile network instead of a 4G Core network S-GW—Serving GateWay (an aggregation node)—responsible for handovers to other networks in terms of all packets across the user plane.

P-GW—packet data network (p) gateway (GW)—connects the LTE network to other packet networks.

PDN—packet data network

GPON—Gigabit Passive Optical Network—A fiber technology using fiber cabling to distribute Internet access to a business or residential area.

Segmented ARQ—(Seg-ARQ) segmented automatic repeat request (packet). The packet serves as a source for extracting the RLC channel ID of a received packet.

HARQ—hybrid automatic repeat request; Codebook to provide the feedback to base station for Downlink data transmission i.e., PDSCH Data . . . . Multiple HARQ processes (up to 16) is supported per UE and there has to be separate feedback for each HARQ Process.

PDCP LAYER—packet data convergence protocol— PDCP is located in the Radio Protocol Stack in the UMTS/LTE/5G Air interface on top of the RLC layer. PDCP provides its services to the RRC and user plane upper layers, (e.g., IP at the UE or to the relay at the base station). The PDCP layer also provides header compression. The air interface, or access mode, is the communication link between the two stations in mobile or wireless communication. The air interface involves both the physical and data link layers (layer 1 and 2) of the OSI model for a connection BH link—backhaul link (backhaul communication node)

Backhaul transport—In a hierarchical telecommunications network, the backhaul portion of the network comprises the intermediate links between the core network, or backbone network, and the small subnetworks at the edge of the network . . . . A backhaul may include wired, fiber optic and wireless components.

DWDM—(mm-wave physical transmission technology)—Dense Wavelength Division Multiplexing is an optical multiplexing technology used to increase bandwidth over existing fiber networks. DWDM works by combining and transmitting multiple signals simultaneously at different wavelengths on the same fiber.

The present invention will now be described with reference to the Figures. FIG. 1 is a functional block diagram illustrating a distributed data processing environment, generally designated 100, in accordance with an embodiment of the present invention. FIG. 1 provides only an illustration of one implementation and does not imply any limitations with regard to the environments in which different embodiments may be implemented. The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In embodiments of the present invention, distributed data processing environment 100 is at least a 5G network that includes RLC 110, SDAP 120, PDCP layer 130, MM-Wave Multiplexing layer 140, and allocated memory 160a, 160b, 160c, and 160d, all interconnected as components of a 5G network. FIG. 1 also depicts asynchronous packets 150 transferring from PDCP layer 130 to RLC 110. To illustrate aspects of embodiments of the present invention, FIG. 1 depicts asynchronous packets 151, which are asynchronous packets 150 that have been saved to allocated memory 160c and 160d as an example. Additionally, FIG. 1 illustrates synchronous packet 170, which represents a time-critical packet that does not include permission for transmission delay.

Radio link control (RLC) 110 performs as a protocol used in 5G New Radio, located on top of the MAC layer and below the PDCP-layer. Radio link control 110 includes packet extractor 111, memory allocator 113, location mapper 115, packet hold manager 117, power-saving program 200, and packet retriever logic 119.

Packet extractor 111 identifies received packets and determines whether the packet has a time-critical delivery requirement. Packet extractor 111 extracts packets that have been confirmed with a non-time-critical delivery requirement by comparison with the list of DTCHs having acceptable QCI indexing for permissible delayed transmission and have mapped the traffic channels to related RLC channels. Memory allocator 113 designates memory pages to the RLC daemon, using existing memory allocation logic, for non-time-critical packets to be stored instead of submitting over radio network channels. The storage of the packet enables the initiation of a sleep state for the RLC carrier controller for transmission multiplexing at the medium access controller and carrier-based multiplexing.

Location mapper 115 provides pointers to the memory locations allocated by memory allocator 113 in which the non-time-critical packets are stored, to power-saving program 200.

Packet hold manager 117 provides an incremental counter of packets held in additionally allocated memory and includes a validation function of a threshold value for holding of packets, which, if exceeded, initiates a wake-up state and processing of the number of stored packets that have met or exceeded the threshold holding value.

Packet retrieve logic 119 provides functions to locate and retrieve the packets stored in allocated memory, enabling a sleep state and power savings for the UE. In some embodiments, packet retrieve logic 119 is initiated by receipt and identification of a time-critical packet by the RLC. In other embodiments, packet retrieve logic 119 is initiated as a result of a packet holding count exceeding a threshold value, or detection of the RLC daemon as active for carrier transformer.

Power-saving program 200 operates with RLC 110. In some embodiments, packet extractor 111, memory allocator 113, Location mapper 115, packet hold manager 117, and packet retrieve logic 119 are module components under the operational control of power-saving program 200, providing functions enabling the saving of non-time-critical packets to memory storage and enabling a sleep state that saves battery power for UE. Discussion of power-saving program 200 includes functions that may be performed by the modules but, for simplicity and clarity, will be presented under the umbrella operation of power-saving program 200.

Power-saving program 200 collects data from SDAP for logical channels for application-level data transmission requirements. The collected data includes radio channel (DTCH) identification from the upper layer of 5G UE user plane protocol and collects the quality-of-service class identifier (QCI), which are used to perform synchronous and asynchronous data transmission decisions. Power-saving program 200 stores the channel and QCI characteristics collected to metadata mapper classes. Power-saving program 200 initiates polling thread at RLC 110 for transport channel fetching and radio resource allocation for the UE. The polling includes DWDM or similar MM-Wave physical transmission technologies in which each transport channel is being allocated for a SLOT for data transmission.

Power-saving program 200 creates a list of logical channels having acceptable QCI indexing for permissible delayed transmission and maps the logical channels with related RLC channels. The determination of permissible transmission delay includes a mapping in which existing pre-defined configuration policies are used in coordination with the dynamic sleep time of RLC multiplexing controllers.

Power-saving program 200, upon receipt of a packet by the RLC multiplexing layer, extracts the RLC channel ID from the segmented automatic repeat request (Seg-ARQ) packet and maps the extracted channel ID to the list indicating permissible delayed packet delivery per channel. Power-saving program 200 determines whether the RLC channel ID matches with the asynchronous data transmission enabled channel list and, if so, saves the packet in the allocated memory and does not immediately transmit the packet. The multiplexer polls other transport channels for non-critical priority packets with permissible delay. The saving of non-time-critical packets in memory removes output from the RLC multiplexer and enables a sleep state to initiate or be maintained. The sleep state saves battery power at the UE by avoiding constant radio resource allocation and allocation of a SLOT for data transmission, as well as activities placing data packets over the transport radio carrier, which are energy demanding.

Power-saving program 200 determines the receipt of a priority packet at the RLC controller. The determination of whether the received packet has a priority status as a time-critical for delivery packet includes extracting the RLC channel ID and related asynchronous field parameters and examining the RLC channel ID and parameters by comparison to the list of permissible delayed delivery logical channels-to-RLC channels mapping. Subsequent to confirmation that the RLC channel ID of the received packet does not match the list mapping related RLC channels to logical channels (synchronous priority packet), power-saving program 200 activates the RLC carrier modulator and multiplexer. The RLC carrier controller is activated for the case in which many packets are stored in memory and in the queue for delayed delivery. In the case in which the high bandwidth input/output (I/O) workload is on hold, the memory allocation manager (memory allocator 113) module activates the RLC carrier controller. In some cases, the RLC carrier controller is activated when the return trip time (RTT) and the time to leave (TTL) attributes of packets are beyond permissible limits of transmission delay values. In some embodiments, the RLC carrier controller is activated at the UE-user plane stack in case the driver detects possible overhead by queue element manipulation of the UE Radio carrier slots.

Power-saving program 200 initiates retrieval of the saved packets from the allocated memory and submits the packets for processing by the MAC multiplexer layer, along with the synchronous priority packet received. The packets are processed in the same awake slot of the RLC carrier multiplexer, further reducing battery power consumed.

Power-saving program 200 continues polling for the SDAP or RLC for triggers that initiate a wake-up state.

SDAP 120, known as the Service Data Adaptation Protocol layer, has responsibility for mapping between a quality-of-service flow from the 5G core network and a data radio bearer, as well as marking the quality-of-service flow identifier (QFI) in uplink and downlink packets. The SDAP also marks transmitted packets with the correct quality-of-service flow identification (QFI) then indicates the correct forwarding treatment of the packet as it traverses the 5G system.

PDCP Layer 130 provides services to user plane upper layers and radio resource control (RRC) acting as a protocol between UE and network base station, establishing the connection and release functions with a radio bearer. PDCP layer 130 has responsibility for the transfer of user plane data and control plane data, implementing ciphering and integrity checking of packet transmission.

MM-wave multiplexing layer 140 is a carrier signal generator of millimeter-wavelength waves (MM-waves) and provides multiplexing of packets for transmission. In some embodiments of the present invention, MM-wave multiplexing layer 140 includes medium access control (MAC) and logical link control (LLC) sublayers that Allocated memory 160a, b, c, and d represent memory pages allocated from RLC 110 by power-saving program 200 in which non-time-critical asynchronous packets are stored enabling a sleep mode in which UE power is saved until a time-critical packet is received and processed. Asynchronous packets saved in allocated memory enable a "sleep" state for transport channels working below RLC, which normally are continuously fetching radio resource allocation for the UE. FIG. 1 depicts asynchronous packets 150 as saved in allocated memory 160c, and 160d.

Asynchronous packets 150 are user plane data packets that are determined to be non-time-critical for delivery, based on the channel and application IDs and the QCI information included in the packet or packet header. Embodiments of the present invention determine whether received packets have a time-critical requirement, based on the application, logical channel, or QCI associated with the packet.

Synchronous packet 170 has a time-critical delivery requirement associated with the packet. Receipt of synchronous packet 170 initiates a wake-up response to sleep states and synchronous packet 170 is processed for transmission. In embodiments of the present invention, asynchronous packets 150 that are saved in allocated memory, such as 160c, and 160d, are retrieved and processed simultaneously along with synchronous packet 170.

Figure 2:
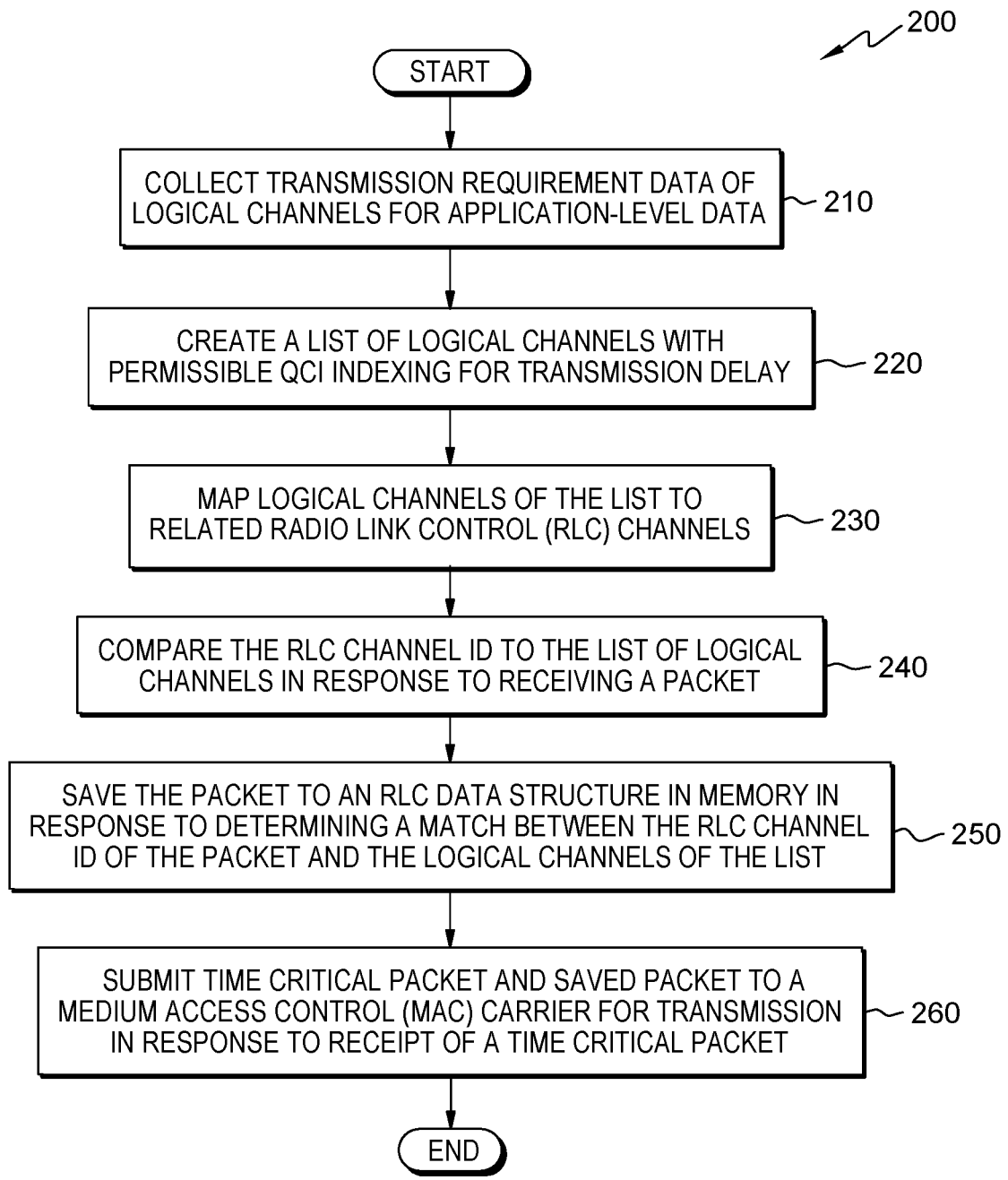
FIG. 2 is a flowchart depicting operational steps of a power-saving program, operating in the network of distributed data processing environment of FIG. 1, in accordance with embodiments of the present invention.

FIG. 2 illustrates operational steps of power-saving program 200, operating in conjunction with RLC 110, within distributed data processing environment 100 of FIG. 1, in accordance with an embodiment of the present invention. Power-saving program 200 reduces the invocation of physical radio interface with user equipment (UE) connected to a 5G network. Power-saving program 200 determines whether received packets allow a delay in transmission and stores the non-time-critical packets in allocated memory, thus eliminating RLC flow over a radio network component, which allows the carrier controller to enter a sleep mode. Power-saving program 200 responds to receipt of a time-critical packet by initiating a wakeup state for the RLC carrier controller and submits the synchronous packet and asynchronous packets retrieved from memory, for transmission processing.

The transport channel layer, working below the RLC carrier controller, continuously fetches radio resource allocation for the UE. This typically works on DWDM or similar MM-Wave physical transmission technologies in which each transport channel is being allocated for a SLOT for data transmission. Based on the slots allocated, the data packets are being placed over the transport radio carrier, and the operation of placement of a data packet over the carrier radio wave consumes large amounts of energy and requires more battery power as the transport channel needs to be prepared for transmission. The preparation includes the transport channel being subscribed and decoded, and the packet needs to be formulated into the physical radio interface format. The transport channel operation of data packet placement requires MM-Wave transcription (millimeter), which is energy-hungry. Embodiments of the present invention collect channel and packet delivery information and create a list of DTCH (logical channels) having acceptable QCI indexing for permissible delayed transmission and, accordingly, maps the logical channels to related RLC channels. The permissible transportation delay feature will be mapped using existing pre-defined configuration policies in coordination with the dynamic sleep time of RLC multiplexing controllers.

Power-saving program 200 collects transmission requirement data of logical channels for application-level data (step 210). Power-saving program 200 collects data from SDAP that includes logical channels for application-level data transmission requirements. Power-saving program 200 collects logical channel (DTCH) ID and QCI mapping characteristics indicating whether packet transmission is time-critical. In some embodiments, power-saving program 200 collects logical channel information from various layered systems and detects which RLC packets are not time-critical and collects QCI and application characteristics.

Power-saving program 200 creates a list of logical channels with permissible QCI indexing for transmission delay (step 220). Power-saving program 200 determines the characteristics associated with non-time-critical packets from the collected logical channel information. Power-saving program 200 uses logical channel ID, QCI values, and application ID to determine the characteristics indicating packets with acceptable transmission delay permissions. Power-saving program 200 creates a listing of the logical channels that include the asynchronous non-time-critical packets that include permissible transmission delay.

Power-saving program 200 maps logical channels of the list to related radio link control (RLC) channels (step 230). Power-saving program 200 maps the list of logical channels having characteristics of permissible delay of packet transmission to the related RLC channels. In some embodiments, the decision of permissible transmission delay channels will be mapped using existing pre-defined configuration policies in coordination with the dynamic sleep time of the RLC multiplexing controllers. In some embodiments, mapping of logical channels to RLC tables of channels is based on application-derived APIs or QCI characteristics and allowed tolerance and transmission delay values.

Power-saving program 200 compares the RLC channel ID to the list of logical channels in response to receiving a packet (step 240). Power-saving program 200 determines a packet is received at the RLC multiplexing layer for translation and radio allocation. Power-saving program 200 extracts the RLC channel ID from a segmented automatic repeat request packet (Seg-ARQ) and performs a mapping of the RLC channel ID to the asynchronous data transmission enabled channel list. Comparison of the RLC channel ID of the received packet to the list of logical channels identified as having characteristics accepting delay of packet transmission determines whether the received packet is a non-time-critical asynchronous packet.

Power-saving program 200 saves the packet to an RLC data structure in allocated memory in response to determining a match between the RLC channel ID of the packet and the logical channels identified in the list (step 250). Having determined that the received packet RLC channel ID is matched in the list of logical channels having acceptable transmission delay permissions (i.e., non-time-critical packets), power-saving program 200 saves the packet in the allocated memory. Power-saving program 200 determines the pointers to the memory address at which the packet is saved. In some embodiments, the holding packet counter is incremented, reflecting the quantity of packets saved to the allocated memory.

For example, a packet of asynchronous packets 150 is received and transported to RCL 110. Power-saving program 200 extracts the RLC channel ID from an ARQ packet and compares the RLC channel ID to the list of logical channels identified as having characteristics accepting delayed transmission of packets. Power-saving program 200 determines that the RLC channel ID of the received packet of asynchronous packets 150 maps to the list of logical channels and initiates saving of the received packet to a location address in allocated memory 160c. Power-saving program 200 determines the pointers to the memory location at which the packet is saved.

Power-saving program 200 submits time-critical packet and saved packet(s) to a medium access control (MAC) carrier for transmission, in response to receipt of a time-critical packet (step 260). Power-saving program 200 continues to poll the RLC carrier for receipt of packets and compares the RCL channel ID and packet transmission requirement information to the list of logical channels that accept delayed packet transmission. In response to determining the received packet is a time-critical priority packet power-saving program 200 initiates a wakeup state for the hybrid automatic repeat request (HARQ) and RCL carrier controller, activating the RLC carrier modulator and multiplexer. Power-saving program 200 retrieves the saved packet(s) from the allocated memory (i.e., via memory address pointers) and submits the time-critical packet and the retrieved saved packet(s) to the MAC carrier (i.e., MM-Wave multiplexing) for processing and transmission.

For example, power-saving program 200 determines that the RLC carrier controller receives a packet and determines that the RLC channel ID does not match the RLC channel IDs of the list mapping to logical channels accepting delayed packet transmission. The received packet has a time-critical characteristic and power-saving program 200 ends a sleep state and initiates a wakeup state for the RLC carrier control and HARQ. Power-saving program 200 retrieves the saved packets in allocated memory and submits the saved packets and the time-critical packet to the MAC carrier for processing and transmission.

In some embodiments, the RLC carrier control is activated due to exceeding a holding count threshold of packets stored in allocated memory. In other embodiments, power-saving program 200 activates the RLC carrier controller from a sleep state due to RTT and TTL values that exceed permissible limits of transmission delay. In yet other embodiments, power-saving program 200 activates the RLC carrier controller in the case that the high bandwidth I/O workload is on hold.

Figure 3:
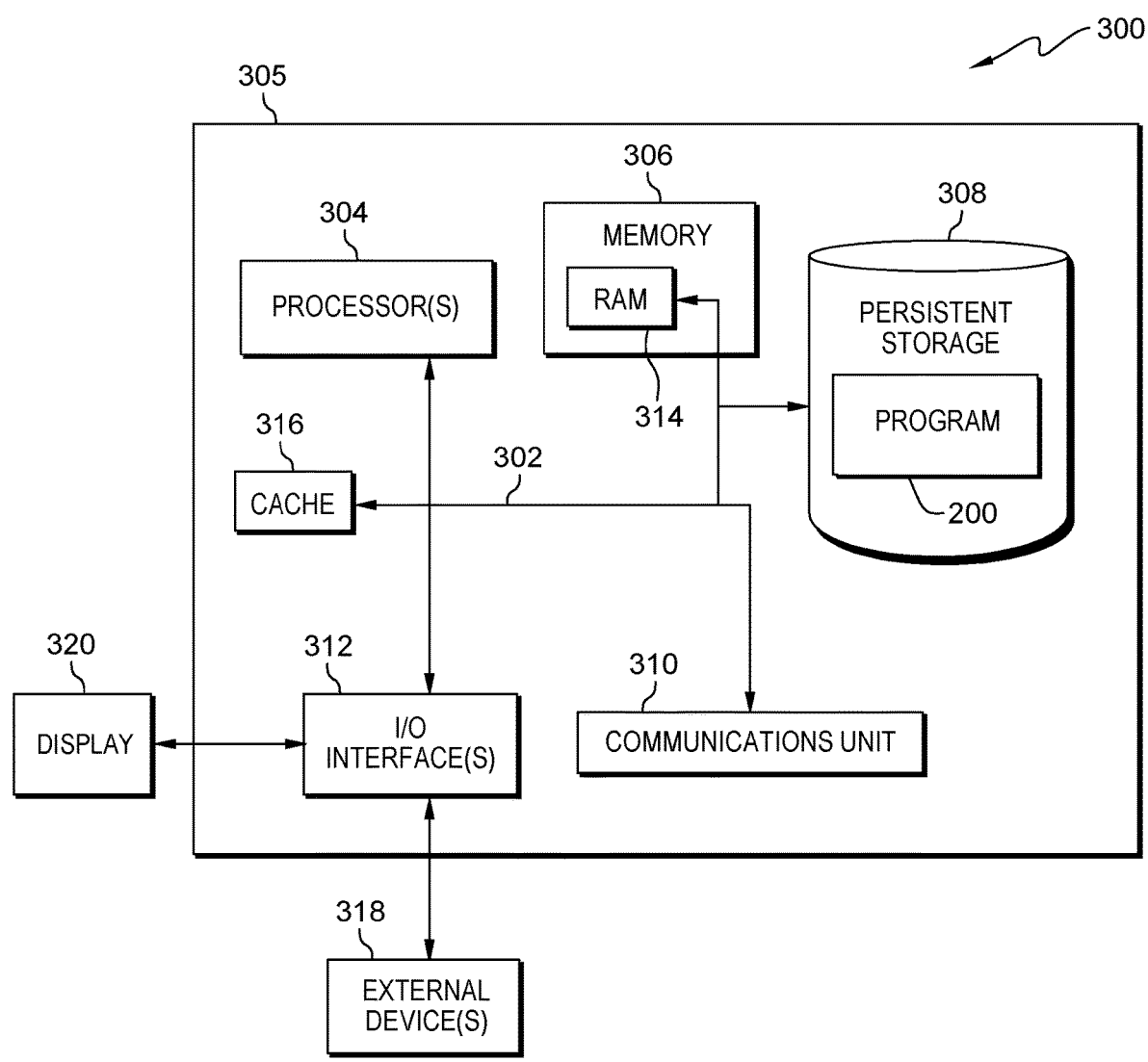
FIG. 3 depicts a block diagram of components of a computing system, including a computing device configured with the capability to operationally perform the power-saving program of FIG. 2, in accordance with an embodiment of the present invention.

FIG. 3 depicts a block diagram of components of system 300, which includes computing device 305. Computing device 305 includes components and functional capability similar to RCL 110, (FIG. 1), in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 305 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306, cache memory 316, and persistent storage 308 are computer readable storage media. In this embodiment, memory 306 includes random access memory (RAM) 314. In general, memory 306 can include any suitable volatile or non-volatile computer readable storage media.

Power-saving program 200 is stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of distributed data processing environment 100, such as PDCP layer 130, and MM-wave multiplexing layer 140. In these examples, communications unit 310 includes one or more network interface cards. Communications unit 310 may provide communications through the use of either or both physical and wireless communications links. Power-saving program 200 may be downloaded to persistent storage 308 through communications unit 310.

I/O interface(s) 312 allows for input and output of data with other devices that may be connected to computing system 300. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., power-saving program 200, can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for battery power-savings of user equipment operating within a 5G network, the method comprising:

initiating, by one or more processors, a collection of transmission requirement data of logical channels for application-level data from a Service Data Adaptation Protocol, wherein logical channel identification (ID), application ID, and quality of service class identifier (QCI) indexing information is collected;

creating, by the one or more processors, a list of the logical channels having acceptable QCI indexing for permissible transmission delay of packets, based on the logical channel identification (ID), application ID, and QCI indexing information;

mapping, by the one or more processors, the list of the logical channels to related radio link control (RLC) channels;

responsive to receipt of a packet by an RLC multiplexing layer, comparing, by the one or more processors, an RLC channel ID from a segmented automatic repeat request (ARQ) packet to the list of the logical channels with a permissible delay of transmission of packets;

responsive to a match between the RLC channel ID and the list of the logical channels, saving, by the one or more processors, the packet to allocated memory in an RLC data structure; and responsive to receipt of a time-critical packet, submitting, by the one or more processors, the time-critical packet and the saved packet to a medium access control (MAC) carrier controller for transmission processing.

2. The method of claim 1, wherein the time-critical packet includes a delivery priority of the packet in which at least one of a round trip time (RTT) or a time to leave (TTL) value exceeds a permissible limit.

3. The method of claim 1, further comprising:

polling, by the one or more processors, the allocated memory to determine whether packet holding exceeds a pre-defined threshold; and polling, by the one or more processors, the allocated memory to determine whether saved packets exceed permissible limits of return trip time or time to leave transmission delay values.

4. The method of claim 1, wherein saving, by the one or more processors, the packet having permissible transmission delay to the allocated memory in the RLC data structure provides power management efficiencies that are integrated into an energy-saving mode of a user equipment (UE) device.

5. The method of claim 1, wherein a radio link control (RLC) carrier controller is activated in response to a quantity of packets saved to memory exceeding a holding threshold value.

6. The method of claim 1, wherein the time-critical and saved packets are submitted concurrently to a same active slot of the RLC multiplexing layer.

7. The method of claim 1, wherein data collection from logical channels provides application-level data transmission requirements and data collected from QCI characteristics provides information for decisions of whether to save packets to memory or transfer the packets without delay to a radio interface.

8. A computer program product for battery power-savings of user equipment operating within a 5G network, the computer program product comprising:

one or more computer readable storage media, and program instructions collectively stored on the one or more computer readable storage media, the program instructions comprising:

program instructions to initiate collection of transmission requirement data of logical channels for application-level data from a Service Data Adaptation Protocol, wherein logical channel identification (ID), application ID, and quality of service class identifier (QCI) indexing information is collected;

program instructions to create a list of the logical channels having acceptable QCI indexing for permissible transmission delay of packets, based on the logical channel identification (ID), application ID, and QCI indexing information;

program instructions to map the list of the logical channels to related radio link control (RLC) channels;

responsive to receipt of a packet by an RLC multiplexing layer, program instructions to compare an RLC channel ID from a segmented automatic repeat request (ARQ) packet to the list of the logical channels with a permissible delay of transmission of packets;

responsive to a match between the RLC channel ID and the list of the logical channels, program instructions to save the packet to allocated memory in an RLC data structure; and responsive to receipt of a time-critical packet, program instructions to submit the time-critical packet and the saved packet to a medium access control (MAC) carrier controller for transmission processing.

9. The computer program product of claim 8, wherein the time-critical packet includes a delivery priority of the packet in which at least one of a round trip time (RTT) or a time to leave (TTL) value exceeds a permissible limit.

10. The computer program product of claim 8, further comprising:

program instructions to poll the allocated memory to determine whether packet holding exceeds a pre-defined threshold; and program instructions to poll the allocated memory to determine whether saved packets exceed permissible limits of return trip time or time to leave transmission delay values.

11. The computer program product of claim 8, wherein a radio link control (RLC) carrier controller is activated in response to program instructions that determine a quantity of packets saved to the allocated memory exceed a holding threshold value.

12. The computer program product of claim 8, wherein program instructions submit the time-critical and saved packets concurrently to a same active slot of the RLC multiplexing layer.

13. The computer program product of claim 8, wherein program instructions for data collection from logical channels provides application-level data transmission requirements and program instructions for data collected from QCI characteristics provides information for decisions of whether to save packets to the allocated memory or transfer the packets without delay to a radio interface.

14. A computer system for battery power-savings of user equipment operating within a 5G network, the computer system comprising:

one or more computer processors;

one or more computer readable storage media, and program instructions collectively stored on the one or more computer readable storage media, the program instructions comprising:

program instructions to initiate collection of transmission requirement data of logical channels for application-level data from a Service Data Adaptation Protocol, wherein logical channel identification (ID), application ID, and quality of service class identifier (QCI) indexing information is collected;

program instructions to create a list of the logical channels having acceptable QCI indexing for permissible transmission delay of packets, based on the logical channel identification (ID), application ID, and QCI indexing information;

program instructions to map the list of the logical channels to related radio link control (RLC) channels;

responsive to receipt of a packet by an RLC multiplexing layer, program instructions to compare an RLC channel ID from a segmented automatic repeat request (ARQ) packet to the list of the logical channels with a permissible delay of transmission of packets;

responsive to a match between the RLC channel ID and the list of the logical channels, program instructions to save the packet to allocated memory in an RLC data structure; and responsive to receipt of a time-critical packet, program instructions to submit the time-critical packet and the saved packet to a medium access control (MAC) carrier controller for transmission processing.

15. The computer system of claim 14, wherein the time-critical packet includes a delivery priority of the packet in which at least one of a round trip time (RTT) or a time to leave (TTL) value exceeds a permissible limit.

16. The computer system of claim 14, further comprising:

program instructions to poll the allocated memory to determine whether packet holding exceeds a pre-defined threshold; and program instructions to poll the allocated memory to determine whether saved packets exceed permissible limits of return trip time or time to leave transmission delay values.

17. The computer system of claim 14, wherein a power management policy is integrated with an energy-saving mode of a user equipment (UE) device.

18. The computer system of claim 14, wherein a radio link control (RLC) carrier controller is activated in response to program instructions that determine a quantity of packets saved to the allocated memory exceed a holding threshold value.

19. The computer system of claim 14, wherein program instructions submit the time-critical and saved packets concurrently to a same active slot of the RLC multiplexing layer.

20. The computer system of claim 14, wherein program instructions for data collection from logical channels provides application-level data transmission requirements and program instructions for data collected from QCI characteristics provides information for decisions of whether to save packets to the allocated memory or transfer the packets without delay to a radio interface.

\* \* \* \* \*